Patented Jan. 14, 1941

2,228,256

UNITED STATES PATENT OFFICE 2,228,256

SUBSTITUTED MALONIC ACID DERIVATIVES AND PROCESS OF PREPARING THEM

Walter G. Christiansen, Glen Ridge, N. J., assignor to E. R. Squibb & Sons, New York, N. Y., a corporation of New York No Drawing. Application August 24, 1937, Serial No. 160,607

8 Claims. (Cl. 260—468)

This invention relates to, and has for its object the provision of, substituted malonic acid derivatives of the general formula

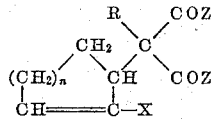

wherein $n$ represents 1 or 2, R represents alkyl or alkenyl, X represents halogen, and the Z's represent halogen, hydroxy, amino, or alkoxy. These compounds may be prepared by reacting a sodio-malonic acid ester with a 1,2-dihalo-delta$^2$-cycloalkene having 5 or 6 carbon atoms in the ring; the cycloalkenes may be prepared by the de-hydrohalogenation of 1,2,3-trihalo-cycloalkanes as described in copending application Serial No. 160,606 filed concurrently herewith, now Patent No. 2,146,720. These substituted malonic acid derivatives are useful as intermediates in the preparation of hypnotics.

The following examples are illustrative of the invention:

Example 1

*Diethyl ethyl-(2-bromo-delta$^2$-cyclohexenyl)-malonate*

4.03 g. of sodium is dissolved in 75 cc. of absolute alcohol; the solution is cooled to 30° C., and 33.3 g. of diethyl ethyl-malonate added. Then, while maintaining the alcoholic solution at 30–35° C., 42 g. of 1,2-dibromo-delta$^2$-cyclohexene is slowly added with stirring. The solution is refluxed for six hours, whereupon the reaction mixture is neutral to litmus paper. The sodium bromide formed is filtered off, and the alcohol is distilled from the filtrate; on rectification of the filtrate, the diethyl ethyl-(2-bromo-delta$^2$-cyclohexenyl)-malonate is obtained as a colorless oil having a boiling point of 141.5–142.5° C. at 1 mm.

Example 2

*Diethyl ethyl-(2-bromo-delta$^2$-cyclopentenyl)-malonate*

8 g. of sodium is dissolved in 200 cc. of absolute alcohol, and 65.3 g. of diethyl ethyl-malonate added. Then 78.5 g. of 1,2-dibromo-delta$^2$-cyclopentene is gradually added to the solution, and the mixture stirred and refluxed for about 10 hours. The alcohol is distilled off, the residual mixture treated with water, and the oil layer extracted with ether. The ether extract is washed with saturated salt solution, and dried over sodium sulphate. After distilling off the ether, the residual oil is fractionated in vacuo. Diethyl ethyl-(2-bromo-delta$^2$-cyclopentenyl)-malonate is obtained as a light yellow oil having a boiling point of 140–145° C. at 2 mm.

Example 3

*Diethyl methyl-(2-bromo-delta$^2$-cyclopentenyl)-malonate*

3 g. of sodium is dissolved in 75 cc. of absolute alcohol, and 23 g. of diethyl methyl-malonate added. Then 30 g. of 1,2-dibromo-delta$^2$-cyclopentene is gradually added to this solution, and the mixture stirred and refluxed for about ten hours. The alcohol is distilled off, the residual mixture treated with water, and the oil extracted with ether. The ether extract is washed with a saturated salt solution and dried over sodium sulphate. After distilling off the ether, the residual oil is fractionated in vacuo. Diethyl methyl-(2-bromo-delta$^2$-cyclopentenyl)-malonate is obtained as a light yellow oil having a boiling point of 138–141° C. at 2 mm.

Example 4

*Diethyl methyl-(2-bromo-delta$^2$-cyclohexenyl)-malonate*

4.4 g. of sodium is dissolved in 79 cc. of absolute alcohol, and 33 g. of diethyl methyl-malonate added. Then, 44.5 g. of 1,2-dibromo-delta$^2$-cyclohexene is gradually added to the solution, and the mixture stirred and refluxed for about 10 hours. The sodium bromide formed is filtered off, and the alcohol removed from the filtrate by distillation. The residual material is treated with water and the oily layer formed is extracted with ether. The ether extract is washed with a saturated salt solution and dried over sodium sulphate. After distilling off the ether, the residual oil is fractionated in vacuo. The diethyl methyl-(2-bromo-delta$^2$-cyclohexenyl)-malonate is obtained as a colorless oil having a boiling point of 147° C. at 1–2 mm.

Example 5

*Diethyl allyl-(2-bromo-delta$^2$-cyclopentenyl)-malonate*

11.5 grams of sodium is dissolved in absolute alcohol and the solution cooled to 30° C. 100 grams of diethyl allyl-malonate is then added. To this solution, 114 grams of 1,2-dibromo-delta$^2$-cyclopentene is added dropwise with stirring at 30° C. The mixture is then stirred for 3.5 hours at 30° C. and then allowed to remain overnight at the same temperature. The reaction mixture is now refluxed and stirred for seven hours, and the alcohol is distilled off. The residue is mixed with 500 cc. of water and the oil layer extracted with ether. The ether extracts are combined, washed with saturated malt solution and dried over sodium sulphate. The ether is distilled off and the residual oil is fractionated in a vacuum. Diethyl allyl-(2-bromo-delta²-cyclopentenyl)-malonate is obtained as a colorless oil having a boiling point of 145–149° C. at 3 mm.

Example 6

*Ethyl-(2-bromo-delta²-cyclohexenyl)-malonic acid*

75 g. of potassium hydroxide is dissolved in one liter of 95% alcohol. The solution is stirred and refluxed while adding 116 g. of diethyl ether-(2-bromo-delta²-cyclohexenyl)-malonate gradually over a twenty-minute period. The mixture is then further stirred and refluxed for about ten hours; the alcohol is distilled off, the residual potassium salt dissolved in 750 cc. water, and the solution acidified with concentrated hydrochloric acid. The mixture is then extracted with five 200 cc. portions of ether; the ether extracts are combined, washed with saturated sodium chloride solution, and dried over sodium sulphate. The solvent is distilled off, and the residual material recrystallized from benzene. Ethyl-(2-bromo-delta²-cyclohexenyl)-malonic acid is obtained as a white crystalline material.

Example 7

*Ethyl-(2-bromo-delta²-cyclohexenyl)-malonyl chloride*

145 g. of ethyl-(2-bromo-delta²-cyclohexenyl)-malonic acid is dissolved in 500 cc. of benzene, 150 g. of thionyl chloride is added, and the mixture is refluxed for about eight hours. The excess thionyl chloride and benzene are distilled off, and the residual oil is rectified in vacuo. The ethyl-(2-bromo-delta²-cyclohexenyl)-malonyl chloride obtained is a light yellow oil.

Example 8

*Ethyl-(2-bromo-delta²-cyclohexenyl)-malonyl amide*

100 cc. of 28% ammonium hydroxide solution is cooled to 0° C. and maintained at this temperature and stirred while adding dropwise 32.8 g. of ethyl-(2-bromo-delta-cyclohexenyl)-malonyl chloride. The mixture is then further stirred for about two hours; the precipitated amide is filtered off, washed with water, and dried in vacuo. On recrystallization from dilute alcohol, ethyl-(2-bromo-delta²-cyclohexenyl)-malonyl amide is obtained as a white crystalline material.

The invention may be variously otherwise embodied, within the scope of the appended claims.

This application is a continuation-in-part of application Serial No. 744,198, filed September 15, 1934, now Patent No. 2,117,299, dated May 17, 1938.

I claim:

1. Compounds having the general formula

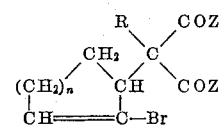

wherein $n$ represents one of the numerals 1 and 2, R represents an alkyl radical, and each Z represents an alkoxy radical.

2. Diethyl ethyl-(2-bromo-delta²-cyclohexenyl)-malonate.

3. Diethyl methyl-(2-bromo-delta²-cyclohexenyl)-malonate.

4. Diethyl allyl-(2-bromo-delta²-cyclopentenyl)-malonate.

5. The process of preparing substituted malonic acid derivatives which comprises reacting an alkyl sodio-R-malonate, wherein R represents a member of the group consisting of alkyl and alkenyl with a 1,2-dihalo-delta²-cycloalkene having 5 to 6 carbon atoms in the ring.

6. The process of preparing substituted malonic acid derivatives which comprises reacting an alkyl sodio-alkyl-malonate with a 1,2-dibromo-delta²-cycloalkene having 5 to 6 carbon atoms in the ring.

7. Compounds having the general formula

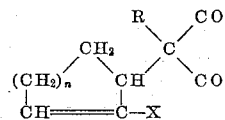

wherein $n$ represents one of the numerals 1 and 2, R represents a member of the group consisting of alkyl and alkenyl, X represents halogen, and both Z's represent the same member of the group consisting of hydroxy and alkoxy.

8. Compounds having the general formula

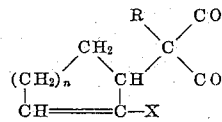

wherein $n$ represents one of the numerals 1 and 2, R represents a member of the group consisting of alkyl and alkenyl, X represents halogen, and each Z represents an alkoxy radical.

WALTER G. CHRISTIANSEN.